March 30, 1954     H. C. BAUMGART     2,673,398
COMBINATION PLUMB BOB AND CHALK LINE REEL
Filed May 11, 1953
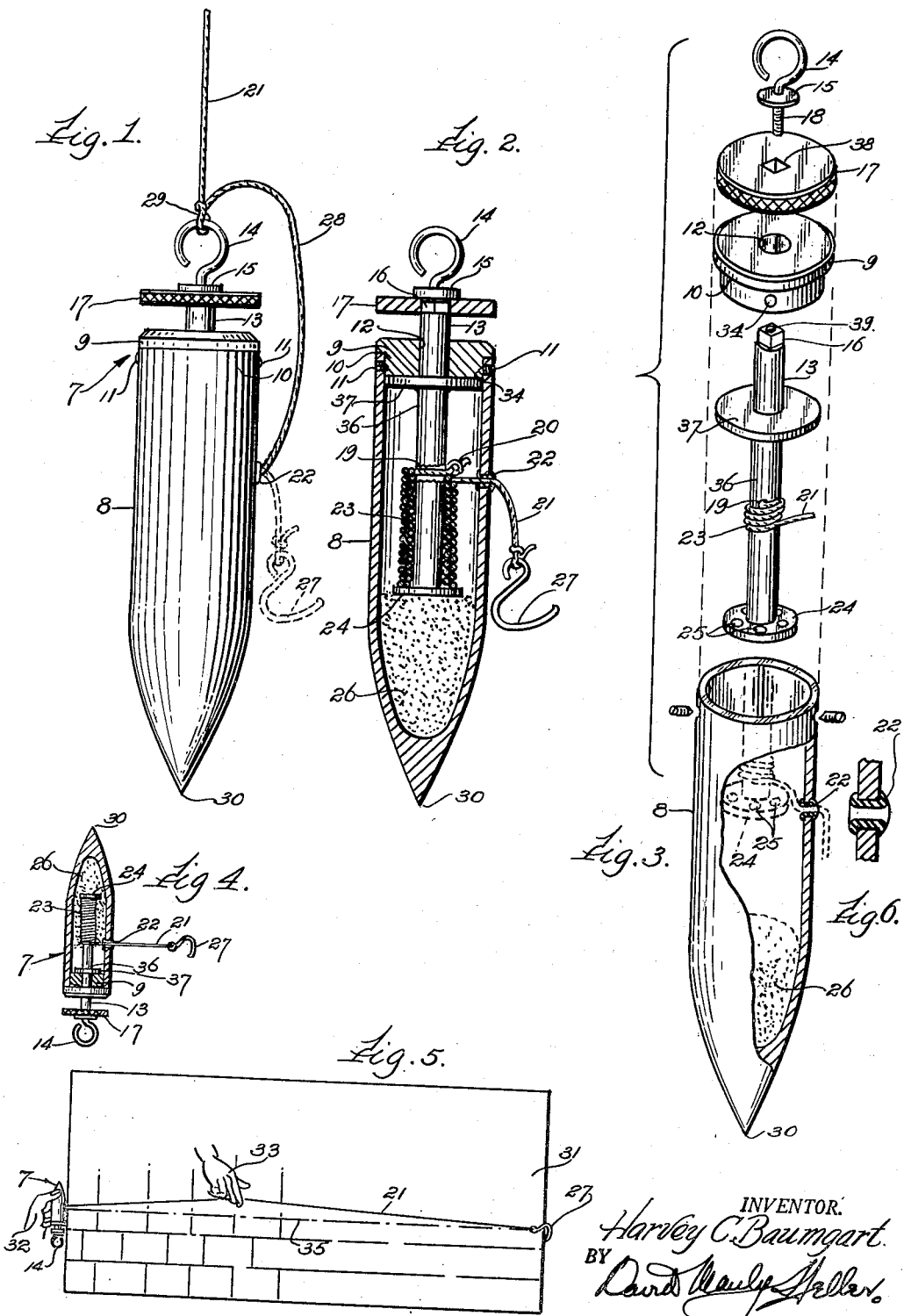
INVENTOR.
Harvey C. Baumgart
BY
ATTORNEY.

Patented Mar. 30, 1954

2,673,398

UNITED STATES PATENT OFFICE 2,673,398

COMBINATION PLUMB BOB AND CHALK LINE REEL

Harvey C. Baumgart, Cicero, Ill.

Application May 11, 1953, Serial No. 354,212

4 Claims. (Cl. 33—87)

My invention relates to combination plumb bob and chalk line means.

An object of the present invention is to provide a hollow plumb bob and chalk line having a reel about which the plumb line is wound and in which the chalk line serves a dual function, namely, to suspend the plumb bob in plumb relationship and further, to afford or to provide a chalk line for marking distances and guide lines in architectural and building work.

A still further object of my invention is to provide in a device of the aforementioned character vertical spool means for reeling up and paying out the line wound thereupon which is in concentric and longitudinal relationship to the plumb bob structure.

A still further object of my invention is to provide a device of the aforementioned character, which accommodates powdered chalk within its confines, and which is readily applicable to the line reeled up and confined therewithin when the said plumb bob is inverted while paying out the line reeled up on the reel.

A still further object of my invention is to provide reel means which is readily removable from assembly for repair or other purposes when that would be necessary without damaging the line reeved through a guide bushing in the wall of the plumb bob structure.

A still further object of my invention is to provide a device of the aforementioned character which is simple in elemental construction, and also of such simple arrangement as to warrant economical manufacture thereof in quantity production.

Other objects and ancillary advantages inherent in my invention will become apparent from the ensuing description when read in the light of the accompanying drawings.

To the attainment of the foregoing objects, the improvement resides in the construction, combination and operative association of parts or elements, one satisfactory embodiment of which is disclosed in the accompanying drawings, in which;

Fig. 1 is a front elevational view of my invention showing how it may be hung to operate for plumb indication.

Fig. 2 is a longitudinal cross-sectionl view taken, substantially, on the median line of Fig. 1.

Fig. 3 is an exploded view showing the elemental structures coordinated to function as a combination plumb bob and chalk line unit.

Fig. 4 is a reduced cross-sectional view similar to Fig. 2 showing how the unit is inverted when it is desired to coat the chalk line with chalk, so as to be able to utilize it in the manner illustrated in Fig. 5, which illustrates a chalk line held under tension and snapped in order to indicate a working guide line or demarcation.

Fig. 6 is an enlarged fragmentary cross-sectional view of the guide bushing for protecting the cord from wear in its operation of being reeled onto, and unreeled from, the spool or reel holder.

Referring to the various views my invention is generally designated 7 and consists of a shell-like body 8 having a cavity therein for holding a quantity of powdered chalk designated 26, and also for storing the reel structure which will be hereinafter more clearly elucidated and described.

The top portion of the top opening of the body 8 is provided with a bore in which the plug 9 having a shoulder 10 is secured by means of set screws 11. The plug 9 is also spotted by a drill at 34 to receive the conical tips of the set screws 11 and provided with a bore 12 in which is housed the spindle 13 of the reel 36, which has an enlarged spool end 37 and a smaller spool end 24 provided with sifting holes 25 to permit the powdered chalk 26 to sift therethrough when the plumb bob is inverted as illustrated in Fig. 4. It should be noted that the spool end 24 is of a smaller diameter so as to readily clear the bushing 22 as illustrated in Fig. 3, whenever it is desired to dismantle the unit for repairs or replacement of chalk lines.

The reel structure is utilized for holding one end of the line 21 which is knotted at 20, by reeving it through the bore 19 in the spindle 13 and winding the line in coils as illustrated and designated 23. The free end of the line 21 having tied thereto a hanging hook 27 which is used as illustrated in Fig. 5 for holding one end of the chalk line to be snapped while the plumb bob is held in the other hand. Since the line 21 may wear from time to time in being reeved through an opening in the tubular body 8, a protective guide bushing made, preferably, of rubber or plastic material designated 22 is provided so as to prevent the cord 21 from fraying or ravelling.

The spindle 13 is provided with a square section 16 to which is secured the knurled rotating knob 17 for winding up the line in coils 23 about the axle 13, the same being held in assembly by means of the plumb bob hook 14 which is provided with a flange 15 and a threaded portion 18; the knurled element 17 being provided with a square hole 38 which will fit the square shank or shoulder 16 of the axle 13.

The plumb bob body 8 tapers to a point 30, which is the indicating point whenever the plumb bob is hung for plumb indication as indicated in Fig. 1, namely, the cord 21 is pulled out to form a loose loop 28 as indicated in full lines and the plumb out to form a loose loop 28 as indicated in full lines and the plumb bob hook 14 is engaged by a knot 29 so that the plumb bob may be suspended by the hanging hook 27. To utilize the chalk line reference is to be had to Fig. 5 where it can be seen that the hanging hook 27 is caused to engage a part of the surface on which a line is to be demarcated or scribed. The line 21 is then tensioned in the proper position while the plumb bob 7 is held in inverted position so as to allow the chalk to cover the line 21 and it is held in one hand 32 and tensioned against the engagement of the hanging hook 27 on the wall 31. The fingers of the other hand 33 then engage the line 21 which is tautly stretched to tension the same to allow it to spring back or snap back, resulting in the demarcation or indication or guide line 35 as shown and illustrated in Fig. 5.

Thus it can be seen that the device is susceptible of two useful purposes, namely, that it may be used as a conventional plub bob is utilized, using the chalk line as a hanging support therefor, so as to indicate plumb alignment and position. The chalk line may also be used for another purpose, namely, that of imprinting guide lines 35 as illustrated in Fig. 5.

It is to be stressed that my invention has a line which serves a dual function, namely, that of a chalk line and also as a support or hanging line for the plumb bob structure. It will be noted that in my device I have provided a reel which is in longitudinal and concentric arrangement with respect to the interior confines of the plumb bob body 8, thus a considerable length of line could be stored within the plumb bob without making it unduly large. The reel provided therefor is also made so that it can be readily removed from the interior without damaging the line, and the guide bushing through which the line will be reeved many times, will prevent the line from fraying in view of the fact that I have provided protection in the form of a smooth bushing therefor.

To dismantle the unit all that is necessary is to remove the two set screws 11 which will permit removal of the plug 9 and permit the device to be dismantled, subsequently to loosening the threaded portion 18 of the plumb bob hook 14 which unites the entire structure in assembly. To reassemble the same all that is needed to be done is to rethread the stem 18 into its corresponding threaded opening 39 and secure the plug 9 in the body 8 and then retain it firmly by means of the set screws 11 which are provided to hold the same in assembly.

Thus it can be seen that when the plumb bob is used normally the line will not be covered with powdered chalk 26, whereas when used as a chalk line, the plumb bob will be inverted and not in the normal position in order to coat the line 21 with a suitable quantity of chalk when paying out the line. By rotation of element 17 the line is retrieved and wound upon the reel to store it within the confines of the body 8.

I believe I have herein illustrated and described the nature of my invention, and expounded, in expository form, the teachings so that those familiar with the art will be able to practice my invention. Inasmuch as the same is susceptible of many modifications, alterations, and improvements, I hereby reserve the right to any improvements, alterations and modifications coming within the scope and spirit of my invention and disclosure, also the right to any improvements impliably embraced in the accompanying illustrations depicting the generally suggested elemental structure of my invention, and also any modifications, improvements, or alterations, falling within the purview of the foregoing description; my invention to be limited only by the subjoined claims.

Having thus described and revealed my invention, what I claim as new and desire to secure by Letters Patent is:

1. Combination plumb bob and chalk-line reel means, comprising a hollow plumb bob body, a chalk-line reel mounted within the confines of the said plumb bob body and having its longitudinal axis concentrically positioned with reference to that of the said plumb bob body, the said chalk-line reel being provided with a spindle element having an end extension projecting beyond the said plumb bob body, a knurled rotating knob secured to the said end extension, a plumb bob hook element provided with a threaded extension securing removably the said knurled rotating knob to the said spindle, powdered chalk confined within the lower portion of the cavity of the said hollow plumb bob body, and a line wound upon the said chalk-line reel having its free end reeved through an opening in the said plumb bob body and adapted to furnish dual functions namely to suspend the plumb bob in normal operation and also as a chalk-line when the said plumb bob is inverted.

2. Combination plumb bob and chalk-line reel means, comprising a hollow plumb bob body, a chalk-line reel mounted within the confines of the said plumb bob body and having its longitudinal axis concentrically positioned with reference to that of the said plumb bob body, the said chalk-line reel being provided with a spindle element having an end extension projecting beyond the said plumb bob body, a knurled rotating knob secured to the said end extension, a plumb bob hook element provided with a threaded extension securing removably the said knurled rotating knob to the said spindle, powdered chalk confined within the lower portion of the cavity of the said hollow plum bob body, and a line wound upon the said chalk-line reel having its free end reeved through an opening in the said plumb bob body and adapted to furnish dual functions namely to suspend the plumb bob in normal operation and also as a chalk-line when the said plumb bob is inverted, the said chalk-line reel having its lower spool end of a smaller diameter than that of the bore in the said plumb bob body to prevent damage to the chalk-line when removing the said chalk-line reel.

3. Combination plumb bob and chalk-line reel means, comprising a hollow plumb bob body, a chalk-line reel mounted within the confines of the said plumb bob body and having its longitudinal axis concentrically positioned with reference to that of the said plumb bob body, the said chalk-line reel being provided with a spindle element having an end extension projecting beyond the said plumb bob body, a knurled rotating knob secured to the said end extension, a plumb bob hook element provided with a threaded extension securing removably the said knurled rotating knob to the said spindle, powdered chalk confined within the lower portion of the cavity of the said hollow plumb bob body, a line wound upon the said chalk-line reel having its free end reeved through an opening in the said plumb bob body and adapted to furnish dual functions namely to suspend the plumb bob in normal operation and also as a chalk-line when the said plumb bob is inverted, a plug element provided with a shoulder secured to the top of the said hollow plumb bob body and further provided with a bore serving as a bearing for the said end extension, set screws securing removably the said plug element to the said hollow plumb bob body, and a resilient bushing secured to the said opening to prevent fraying of the said chalk line when in use.

4. Combination plumb bob and chalk-line reel means, comprising a hollow plumb bob body, a chalk-line reel mounted within the confines of the said plumb bob body and having its longitudinal axis concentrically positioned with reference to that of the said plumb bob body, the said chalk-line reel being provided with a spindle element having an end extension projecting beyond the said plumb bob body, a knurled rotating knob secured to the said end extension, a plumb bob hook element provided with a threaded extension securing removably the said knurled rotating knob to the said spindle, powdered chalk confined within the lower portion of the cavity of the said hollow plumb bob body, a line wound upon the said chalk-line reel having its free end reeved through an opening in the said plumb bob body and adapted to furnish dual functions namely to suspend the plumb bob in normal operation and also as a chalk-line when the said plumb bob is inverted, the said chalk-line reel having its lower spool end of a smaller diameter than that of the bore in the said plumb bob body to prevent damage to the chalk-line when removing the said chalk-line reel, a plug element provided with a shoulder secured to the top of said hollow plumb bob body and further provided with a bore serving as a bearing for the said end extension, set screws securing removably the said plug element to the said hollow plumb bob body, and a resilient bushing secured to the said opening to prevent fraying of the said chalk line when in use.

HARVEY C. BAUMGART.

References Cited in the file of this patent

UNITED STATES PATENTS

| Number | Name | Date |
|---|---|---|
| 916,608 | Schmidtke | Mar. 30, 1909 |
| 1,876,473 | Spaeth et al. | Sept. 6, 1932 |
| 2,602,605 | Shilling | July 8, 1952 |